United States Patent
Vyas et al.

(10) Patent No.: US 11,055,133 B2
(45) Date of Patent: Jul. 6, 2021

(54) NODE-LOCAL-UNSCHEDULER FOR SCHEDULING REMEDIATION

(71) Applicant: Red Hat, Inc., Raleigh, NC (US)

(72) Inventors: Jay Vyas, Concord, MA (US); Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 289 days.

(21) Appl. No.: 15/606,697

(22) Filed: May 26, 2017

(65) Prior Publication Data

US 2018/0341519 A1 Nov. 29, 2018

(51) Int. Cl.
  G06F 9/46 (2006.01)
  G06F 9/48 (2006.01)
  G06F 9/50 (2006.01)

(52) U.S. Cl.
  CPC .......... *G06F 9/4856* (2013.01); *G06F 9/5072* (2013.01)

(58) Field of Classification Search
  None
  See application file for complete search history.

(56) References Cited

U.S. PATENT DOCUMENTS

| | | | |
|---|---|---|---|
| 7,587,721 B2 | 9/2009 | Schmidt et al. | |
| 7,814,491 B1 * | 10/2010 | Chen | G06F 9/5016 709/226 |
| 8,869,164 B2 * | 10/2014 | Bobroff | G06F 9/505 |
| 9,086,925 B2 | 7/2015 | Li et al. | |
| 2016/0072726 A1 * | 3/2016 | Soni | H04L 41/0896 709/208 |
| 2016/0162336 A1 | 6/2016 | Zheng et al. | |
| 2017/0060707 A1 * | 3/2017 | Harper | G06F 11/2025 |

FOREIGN PATENT DOCUMENTS

CN 106027643 A 10/2016

OTHER PUBLICATIONS

Justin Ellingwood, "An Introduction to Kubernetes", Oct. 2014, https://web.archive.org/web/20151001183617/https://www.digitalocean.com/community/tutorials/an-introduction-to-kubernetes (Year: 2014).*

James Strachan, "Kubernetes for developers", May 2015, https://blog.fabric8.io/kubernetes-for-developers-2a9c7202fcd3 (Year: 2015).*

(Continued)

*Primary Examiner* — Wei Y Zhen
*Assistant Examiner* — Lanny N Ung
(74) *Attorney, Agent, or Firm* — K&L Gates LLP

(57) ABSTRACT

A system for scheduling remediation includes a memory, a processor in communication with the memory, a container scheduled on a first node, a scheduler executing on the processor, and a node-local-unscheduler ("NLU"). The scheduler has a watch module. The NLU executes on the processor to determine a status of the container as failing validation. The NLU has access to scheduling policies corresponding to the container and the first node. Responsive to determining the status of the container as failing validation, the NLU annotates the container and stops execution of the container. The watch module executes on the processor to detect the annotation associated with the container. Responsive to detecting the annotation, the container is rescheduled to a second node.

18 Claims, 5 Drawing Sheets

(56) References Cited

OTHER PUBLICATIONS

Csaba Rotter et al., "Using Linux Containers in Telecom Applications", Mar. 3, 2016, 19th International ICIN Conference, pp. 234-241 (Year: 2016).*

Jean-Mathieu Saponaro, "Monitoring Kubernetes performance metrics", Nov. 8, 2016, https://www.datadoghq.com/blog/monitoring-kubernetes-performance-metrics/ (Year: 2016).*

Assigning Pods to Nodes, The Kubernetes Authors, Copyright 2017 The Linux Foundation, retrieved from the Internet on Mar. 28, 2017 (9 pages) Link: https://kubernetes.io/docs/concepts/configuration/assign-pod-node/.

Cluster Administration, Copyright 2017 Red Hat, Inc., retrieved from the Internet on Mar. 28, 2017 (121 pages) Link: https://access.redhat.com/documentation/en-us/openshift_container_platform/3.3/html-single/cluster_administration/.

Nagar, Shailabh, Communication and Scheduling in Clusters: A User-lever Perspective, dated Aug. 2001 (203 pages).

Nagar et al., A Closer Look At Scheduling Strategies for a Network of Workstations, Department of Computer Science & Engineering, The Pennsylvania State University, dated Oct. 1998 (21 pages).

Rescheduler Proposal Draft: manually rescheduling part #21543, dated Feb. 19, 2016 (4 pages) Link: https://github.com/kubernetes/kubernetes/issues/21543.

\* cited by examiner

NODE-LOCAL-UNSCHEDULER FOR SCHEDULING REMEDIATION

BACKGROUND

Computer systems may run applications or services that are provided via a server or cloud. The applications or services can be developed and deployed as a single unit or as multiple units, such as a collection of microservices. Applications or microservices may run within containers, which may be run on physical or virtual machines. For example, containers may encapsulate a lightweight runtime environment for an application or a microservice. In microservice architectures, containers are scheduled on nodes or node clusters by a scheduler. Scheduling is achieved according to available resources and scheduling policies associated with the node and/or container to ensure that the containers operate properly while running on the node.

SUMMARY

The present disclosure provides new and innovative systems and methods for container scheduling remediation. In an example, a system includes a memory, a processor in communication with the memory, a container scheduled on a first node, a scheduler executing on the processor, and a node-local-unscheduler ("NLU"). The scheduler has a watch module. The NLU executes on the processor to determine a status of the container as failing validation. The NLU has access to scheduling policies corresponding to the container and the first node. Responsive to determining the status of the container as failing validation, the NLU annotates the container and stops execution of the container. The watch module executes on the processor to detect the annotation associated with the container. Responsive to detecting the annotation, the container is rescheduled to a second node.

In an example, a method includes determining, by a NLU, a status of a container scheduled on a first node as failing validation. The NLU has access to scheduling policies corresponding to the container and the first node. Responsive to determining the status of the container as failing validation, the NLU annotates the container and stops execution of the container. Then, a watch module detects the annotation associated with the container. Responsive to detecting the annotation, rescheduling, the container is rescheduled to a second node.

In an example, non-transitory machine readable medium stores code, which when executed by a processor, causes a node-local-unscheduler to determine a status of a container scheduled on a first node as failing validation. The NLU has access to of scheduling policies corresponding to the container and the first node. Responsive to determining the status of the container as failing validation, the NLU annotates the container and stops execution of the container. The annotated container is detected by a watch module and responsive to detecting the annotation, the container is rescheduled to a second node.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
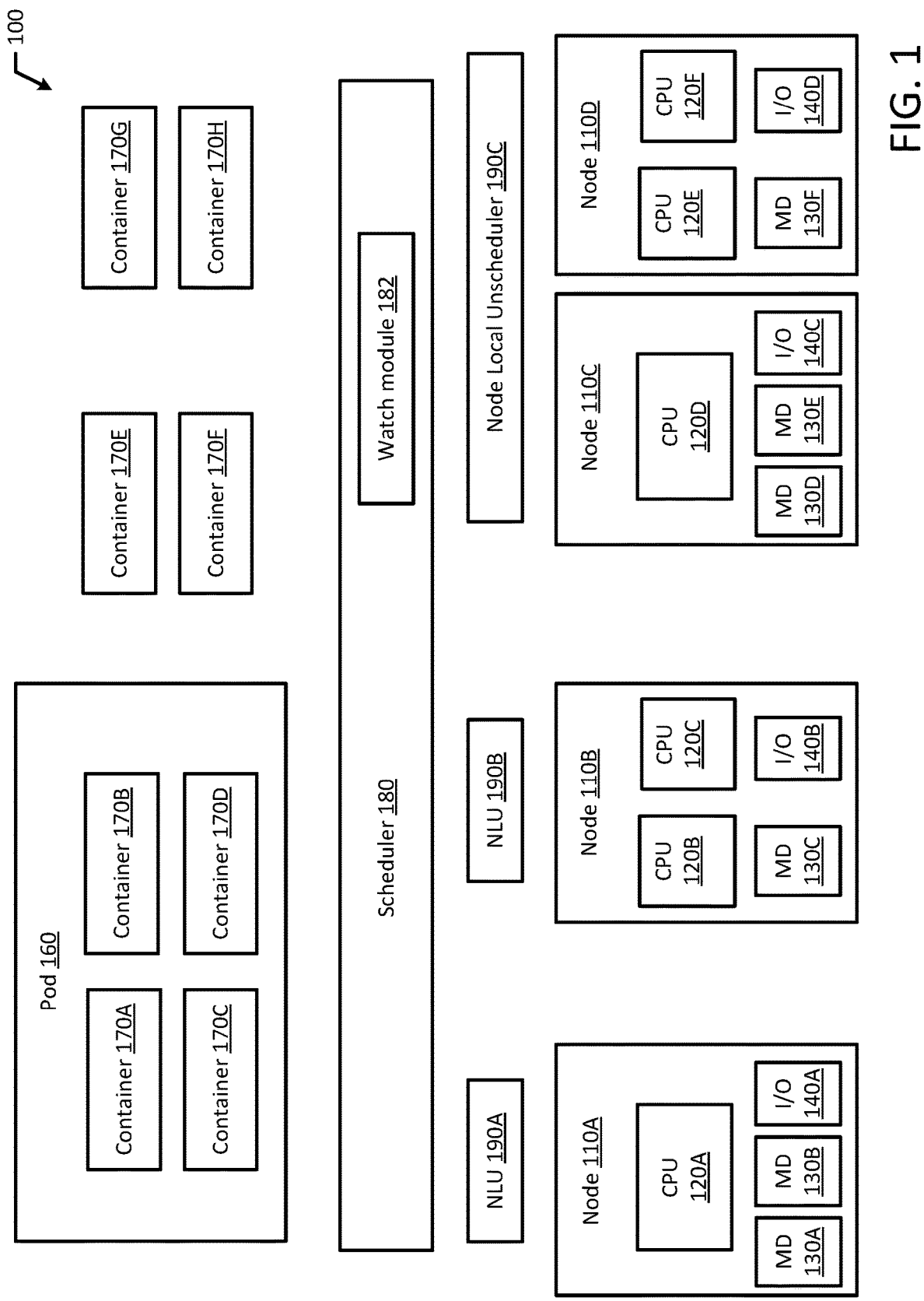
FIG. 1 illustrates a block diagram of an example container system according to an example embodiment of the present disclosure.

Techniques are disclosed for scheduling remediation (e.g., detecting and correcting scheduling violations). Containers and/or pods may be added to a computer system to provide additional application functionality or to scale certain services or aspects of an application. For example, as processes are scaled to meet increased demand from clients, containers are replicated and deployed on various nodes and/or node clusters to handle the increased load. However, containers may be incorrectly or poorly scheduled to nodes due to lack of up-to-date information about the node, such as available node resources, node scheduling policies, and/or information regarding other containers running on the node. Further, when schedulers are overloaded with scheduling tasks, a scheduler may have insufficient time and or resources to fully analyze container destinations, and in some cases may schedule a container on a random node without confirming the node is an appropriate destination for the container or on a node that has been partly confirmed as an appropriate destination for the container.

Improperly or poorly scheduled pods and/or containers may become stuck in a pending state, such that scheduling on a node cannot be completed. Typically, a container may be stuck in a pending state because there are insufficient resources of one type or another that prevent the container from running on the node. For example, the supply of CPU or memory may have been exhausted on a node or a node cluster. Additionally, scheduling violations may result in memory being allocated to container objects that do not work properly or efficiently, and the system may have trouble reclaiming memory allocated to broken objects. When deallocation of memory fails, the amount of memory (e.g., RAM) taken up by a container application may grow, and over time, the memory consumption of the container may degrade node performance and may slow applications down. Excessive memory use may even crash a node process or a container, leading to dropped requests and downtime.

Previous techniques for preventing and correcting scheduling errors include double checking scheduling destinations with the scheduler, however, this technique is very computationally expensive as the scheduler may perform approximately twice the analysis before scheduling a container. Additionally, analyzing each node and container to achieve scheduling remediation is often error prone, for example, the scheduler typically looks at all nodes and node cluster resources before rescheduling containers, which is time consuming and computationally expensive. Other techniques include competing schedulers or reschedulers, but these heavy weight solutions are difficult to slot into an existing scheduler system. For example, architectural constraints and/or performance requirements make either reschedulers or competing schedulers impractical to use in high availability or real time application environments. Additionally, the use of multiple or competing schedulers may reduce the integrity and security of the system. For example, multiple schedulers may result in split-brained activity where each scheduler makes scheduling decisions independently and agnostically, which may result in additional scheduling violations. Moreover, using multiple schedulers may make it more difficult to detect variations in scheduler compliance since each scheduler may constitute scheduling violations thereby compounding the problem.

In order to remediate scheduling violations without the excessive overhead of multiple schedulers or having the scheduler double checking scheduling decisions, a node-local-unscheduler may be used. The NLU reviews scheduled containers and determines if containers have been improperly scheduled (e.g., constitute a scheduling violation), and if so, unschedules the improperly scheduled containers. For example, if a container fails validation from the NLU, the NLU may annotate the container and stop execution of the container, which advantageously prevents the problem container from consuming resources, which may slow down other container applications running on a node or in severe cases, may crash a node process or another container running on the node. Then, the scheduler may detect the annotation associated with the container and reschedule the container using its normal scheduling routine. For example, annotated containers are added back into the scheduler's scheduling queue, which advantageously enables the scheduler to reschedule containers with more recent and up-to-date information about node resource availability, scheduling policies, etc. Thus, the same scheduler is used to schedule pods and/or containers, thereby eliminated the risk and overhead associated with using multiple schedulers (e.g., split-brain activity). Additionally, given the safe guard of the node-local-unscheduler, the scheduler can execute scheduling operations quickly, which enables dirty scheduling, such that containers can be effectively dispatched to nodes in demanding work environments while still having the capability to remediate poorly scheduled containers using the none-local-unscheduler.

FIG. 1 depicts a high-level component diagram of an example container system 100 in accordance with one or more aspects of the present disclosure. The container system 100 may include a scheduler 180 that implement one or more pod(s) 160 and/or containers 170A-H on various nodes 110A-D. Additionally, the container system 100 may include one or more node-local-unschedulers 190A-C.

Pod(s) 160 may each include one or more containers 170A-H. For example, containers 170A-D may be treated as a single unit of deployment in pod 160. In an example, containers 170A-D may be organized in pod 160 and may be co-located on the same node (e.g., node 110A) and share the same resources. Pod 160 and associated containers 170A-D may be located on node 110A and share the same resources, network, memory, and storage of the node 110A (e.g., CPU120A, memory devices 130A-B, and input/output device(s) 140A). Similarly, pod 160 may be located on a node cluster or group of nodes (e.g., nodes 110C-D). Each pod 160 may have a dedicated IP address that is shared by all the containers belonging to each pod respectively. Additionally, a pod 160 and/or containers 170A-H scheduled to a node cluster may share the resources of the node cluster (e.g., CPU120D-F, memory devices 130D-F, and input/output device(s) 140C-D). In an example, multiple pods 160 may be located on the same node (e.g., node 110B). In another example, each pod 160 may be located on its own node 110A-D. Similarly, containers 170A-H may run on the same node (e.g., node 110A) or on different nodes 110, for example, each container 170 may be located on its own node 110.

Containers 170A-H may execute applications or services, such as microservices. In an example, the containers 170A-H may each run a process or service and the containers 170A-H may be any execution environment. For example, the containers 170A-H may be a server, such as a virtual server. It should be appreciated that the containers 170A-H may be stand alone execution environments, similar to that of a virtual machine.

Node-local-unschedulers 190A-C may be assigned to a node 110 or a node cluster (e.g., nodes 110C-D). For example, NLU 190A may be assigned to node 110A and containers 170A-D in pod 160. Similarly, NLU 190B may be assigned to node 110B, which may have containers 170E-F running on it. Additionally, NLU 190C may be assigned to a node cluster (e.g., nodes 110C-D), which may have multiple containers, such as containers 170G-H running on the node cluster. The NLU 190 may be able to review all pods 160 and/or containers 170 scheduled on a local node 110 or node cluster. Additionally, the NLU 190 may have access to scheduling policies, node specific information, etc. Once a pod 160 and/or container 170 is scheduled to a node 110, it may typically be started without hesitation. The NLU 190 may attempt to validate the pod 160 and/or container in the background 170. The validation may occur before or after a container 170 starts running on a node 110. For example, the validation may occur after a container 170 is scheduled to a node 100, but before the container 170 starts on the node 110. For example, the NLU 190, while running in the background, may determine a container 170 fails validation because the pod 160 or container 170 is scheduled to a node 110 with insufficient resources. Additionally, NLU 190 may validate a container 170 after the container is running. For example, the NLU 190 may determine a pod 160 or container 170 fails validation because the pod 160 or container 170 may be running without the proper resources, or the pod 160 or container 170 may be running alongside another pod 160 or container 170 even though anti-affinity scheduling is preferred.

In an example, resource availability may include resource availability metrics such as a processor availability metric and/or a memory availability metric. The processor availability metric my represent available CPU, such as 200 m (e.g., two hundred millicpu or two hundred millicores). The memory availability metric may represent available memory, such as 256 MB, 2 GB, etc. In an example, the memory availability metric may include a random access memory availability metric that represents the available random access memory on the host 110. Additionally, a container 170 may have resource requirements, which may include resource requirement metrics. Resource requirement metrics may include required CPU and/or required memory.

Scheduler 180 may schedule containers 170 and/or pods 160 based on resource availability and the scheduling policies of each container 170 and/or node 110. Scheduler 180 may be a monolithic scheduler that handles all scheduling requests or a shared-state scheduler. A shared-state scheduler may have multiple scheduling components with full access to the entire cluster of resources. In an example, scheduler 180 may be a cluster scheduler that uses placement constraints and schedules applications. Additionally, scheduler 180 may schedule applications rapidly to avoid applications or containers 170 from sitting in a pending state. The scheduler 180 may include a watch module 182 that detects annotations associated with a container 170. Additionally, the watch module 182 may reschedule containers 170 in response to detecting an annotation, such as a flag or other indication in metadata corresponding to the container 170.

Each node 110A-D may in turn include one or more physical processors (e.g., CPU 120A-F) communicatively coupled to memory devices (e.g., MD 130A-F) and input/output devices (e.g., I/O 140A-D). As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-F refers to a volatile or non-volatile memory device, such as RAM, ROM, EEPROM, or any other device capable of storing data. As discussed herein, I/O device 140A-D refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-F may be provided by one or more local buses of suitable architecture, for example, peripheral component interconnect (PCI).

Figure 2:
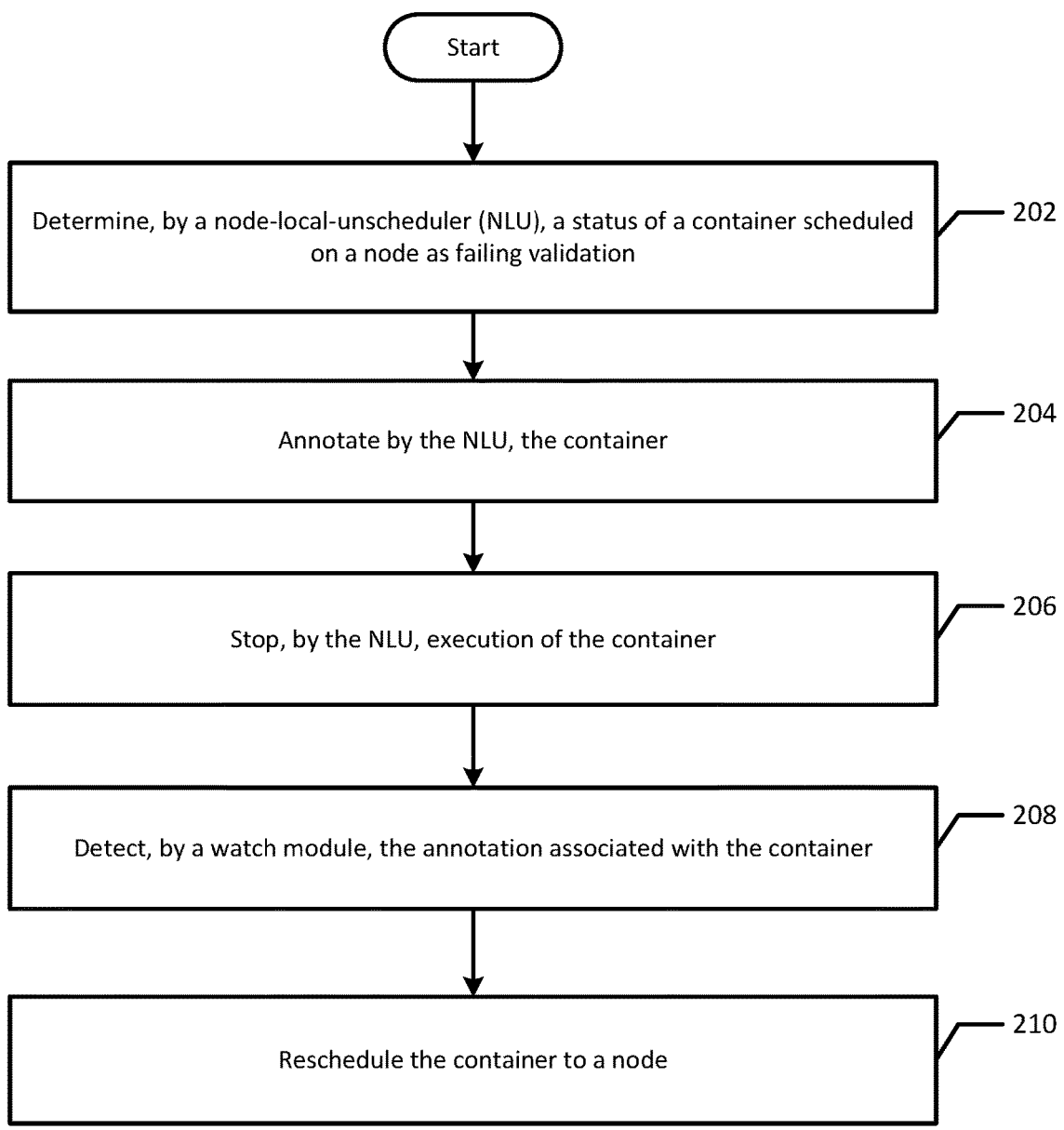
FIG. 2 illustrates a flowchart of an example process for container scheduling remediation according to an example embodiment of the present disclosure.

FIG. 2 illustrates a flowchart of an example method 200 for scheduling remediation in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes a node-local-unscheduler ("NLU") determining a status of a container scheduled on a node as failing validation (block 202). For example, a NLU 190 may have access to scheduling policies corresponding to a container 170 and the container 170 may fail validation if the node (e.g., node 110A) has insufficient resources available for the container 170 or if the node 110A and/or container 170 have conflicting scheduling polices. In an example, a node 110 may have specific scheduling policies (e.g., affinity scheduling, anti-affinity scheduling, and so forth) that dictate which node(s) 110 a container 170 is eligible to be scheduled on. Additionally, a container 170 may have specific scheduling policies. For example, affinity scheduling, such as node affinity, constrains which node(s) 110 a container 170 is eligible to schedule on, based on labels on the node 110. Anti-affinity scheduling constrains which node(s) a container 170 is eligible to be scheduled on based on labels on pods 160 and/or containers 170 that are already running on the node 110 rather than based on labels on the node 110. In an example, a scheduling policy can be hard (e.g., required during scheduling) or soft (e.g., preferred during scheduling). For example, a soft scheduling policy may indicate that container 170 should not run in a node 110 if that node 110 is already running one or more containers that meet a specific criteria, such as a specific run-time rule. Additionally, a scheduling policy may indicate that a container should or must not run in a node dedicated to a specific cloud provider region, a zone, domain, etc.

Then, the NLU annotates the container (block 204). For example, the NLU 190 may annotate the container 170 by editing metadata associated with the container 170. In an example, responsive to determining the status of the container 170 as failing validation, the NLU 190 may write an entry in the container metadata, such as a container condition in a "container_conditions" field. Container conditions may include "container created", "container scheduled", "container fails validation", "container unscheduled", etc. These conditions may be immutable and may include a timestamp such that the current state of a container 170 can be readily determined. Additionally, the NLU 190 may delete a value or entry from container data, such as container metadata. For example, the NLU 190 may annotate the container 170 by either adding information or removing information from container metadata or other data corresponding to the container 170. Additionally, the NLU 190 may annotated the container 170 by both adding information and removing information from container metadata or other data corresponding to the container 170. In another example, NLU 190 may annotate container 170 with a validation flag. For example, the flag may indicate that the container failed validation. Conversely, the flag may indicate that the container passed validation. The flag may be an entry in container metadata or in memory on the node 110. Additionally, the flag may be stored by the NLU 190 in a database that is accessible by the scheduler 180 and/or watch module 182.

Then, the NLU stops execution of the container (block 206). For example, the NLU 190 may stop execution of container 170 after determining that container 170 fails validation. For example, the node that container 170 was originally scheduled to (e.g., node 110A) may be incompatible with container 170, for example, node 110A may have insufficient resources to run the container 170 or the scheduling policies may be conflicting between node 110A and the container 170. By stopping execution of the container 170, the NLU 190 may prevent the container 170 from starting and may protect other processes running on node 110. Additionally, by stopping the container 170, other containers or processes may advantageously continue to run with sufficient resources from the node 110A while minimizing the risk of node 110A crashing or other applications slowing down due to the scheduling violation of container 170 on node 110A.

After the NLU annotates the container, a watch module detects the annotation associated with the container (block 208). For example, a scheduler 180 with a watch module 182 may detect the annotation associated with the container 170.

In an example, the watch module 182 may poll containers 170 for the annotation. Additionally, the watch module 182 may have access to review metadata associated with containers 170, such that it can read the metadata to detect an annotation. Next, the container is rescheduled to a node (block 210). For example, responsive to detecting the annotation, the scheduler 180 may dispatch the container 170 to a different node 110, such as node 110B. In an example, the scheduler 180 may reschedule the container 170 to the same node (e.g., node 110A). For example, the resource availability on node 110A may have changed making it a more suitable location for container 170. For example, from the time container 170 was originally scheduled on node 110A to the time container 170 was rescheduled on node 110A, other containers running on node 110A may have been terminated or killed thereby freeing up additional resources on node 110A and changing the scheduling policies associated with other containers 170 on node 110A. Additionally, the watch module 182 may reschedule the container 170 to a different node 110 after detecting the annotation. For example, the watch module 182 may reschedule containers in a higher priority queue than the scheduler 180.

After the container 170 has been rescheduled, the scheduler 180 may remove the flag associated with the container 170. In an example, the watch module 182 may remove the flag upon rescheduling the container 170.

Figure 3A:
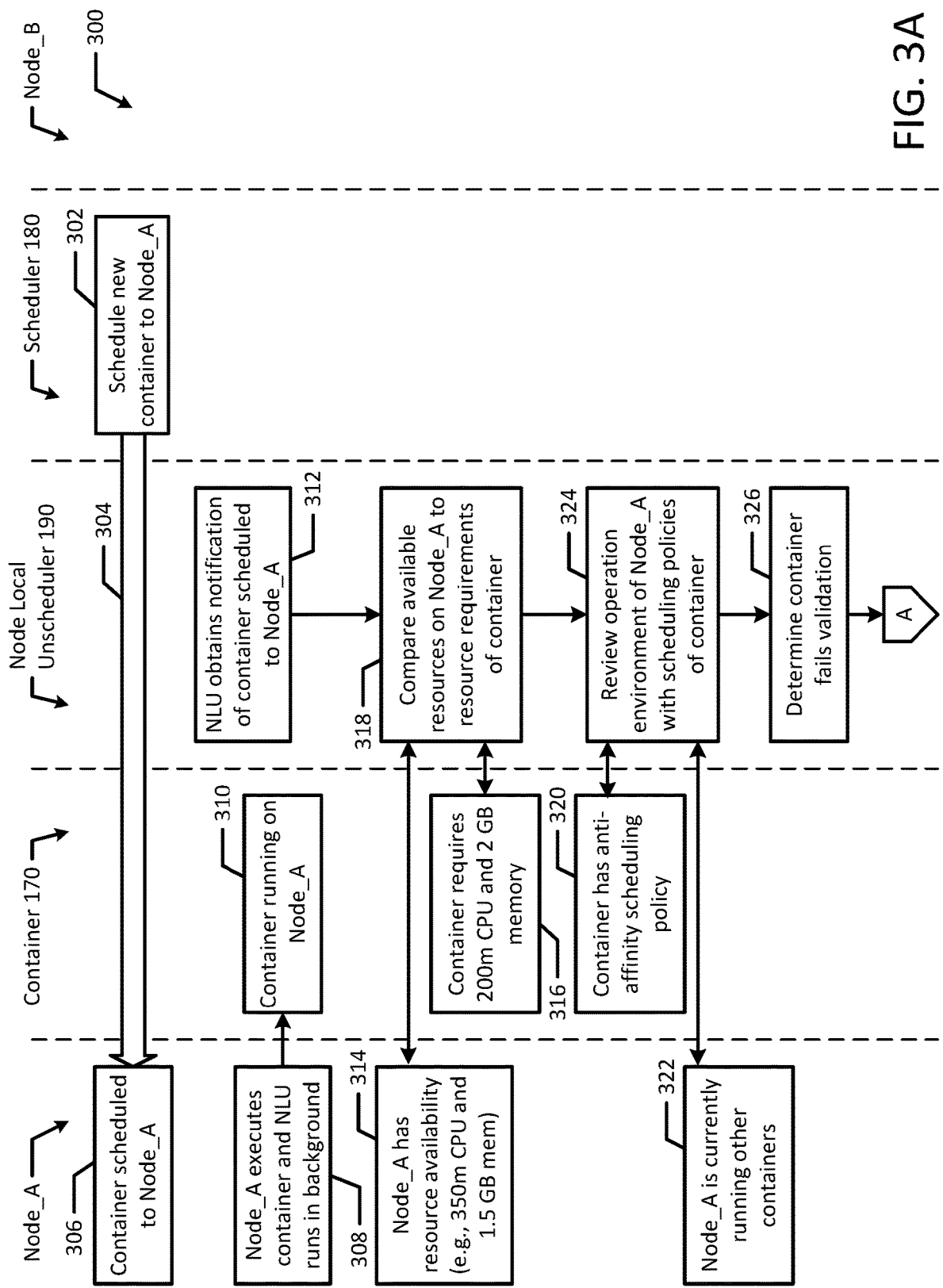
FIGS. 3A and 3B illustrate a flow diagram of an example process for container scheduling remediation according to an example embodiment of the present disclosure.
Figure 3B:
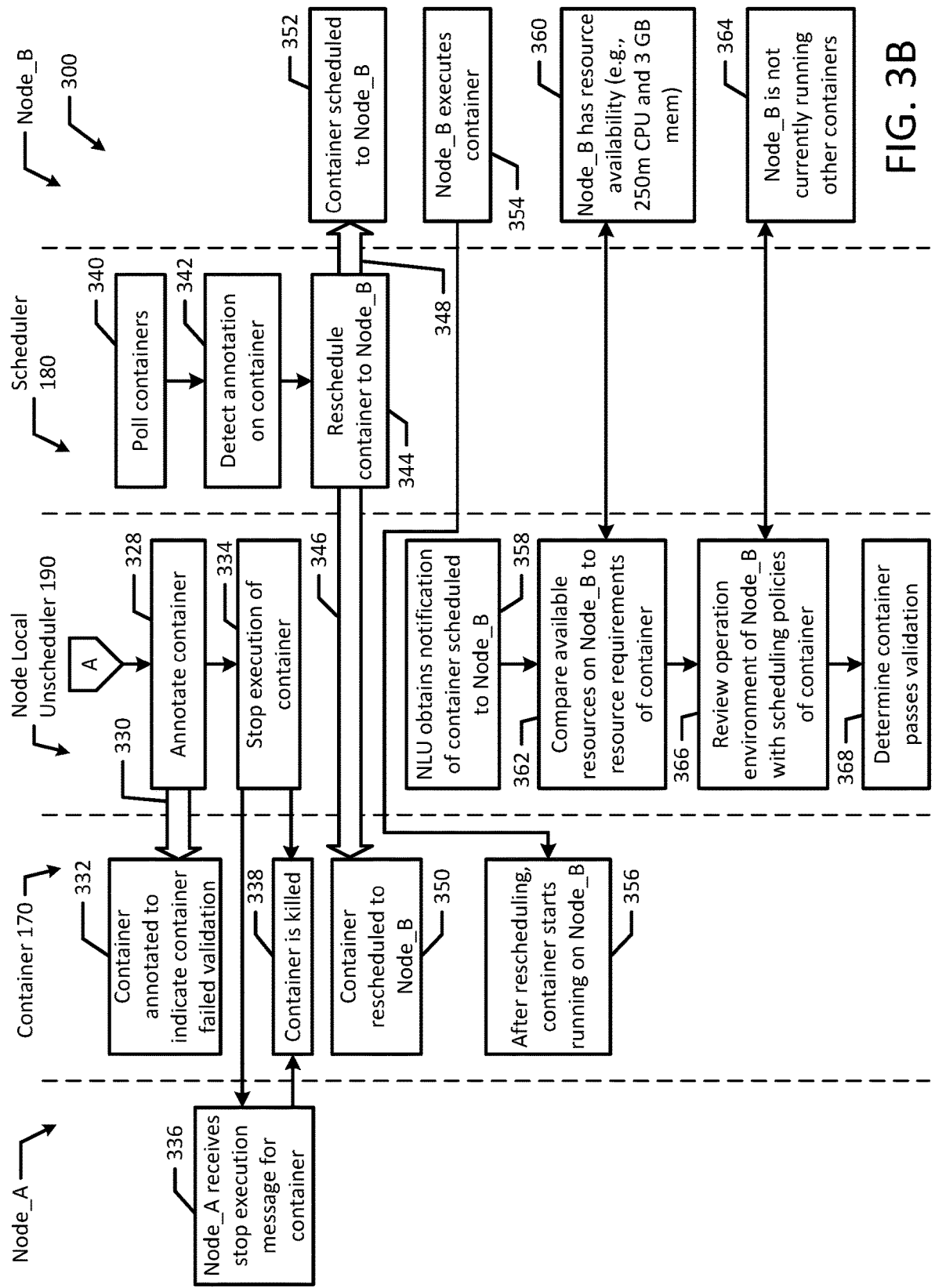

FIGS. 3A and 3B illustrate a flowchart of an example method 300 for scheduling remediation. Although the example method 300 is described with reference to the flowcharts illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by various nodes 110 (e.g., node_A and node_B), container 170, a scheduler 180, and a node-local-unscheduler 190, which may communicate to perform example method 300.

In the illustrated example, scheduler 180 schedules a new container 170 to node_A (blocks 302 and 304). For example, scheduler 180 may schedule container 170 to node_A according to increased need for a specific service or to scale the application provided by container 170. Then, container 170 is scheduled to node_A (block 306). For example, container 170 may be scheduled to node_A after the scheduler 180 does a preliminary review of the container 170 and available nodes 110. Then, node_A executes container 170 and the NLU 190 runs in the background (block 308). For example, NLU 190 may start running in the background after a container is executed by a node 110, such as node_A. Additionally, NLU 190 may already be running in the background on node_A. After node_A executes the container 170, the container 170 is running on node_A (block 310). For example, container 170 may typically be started on node_A without hesitation.

After the new container 170 is scheduled to a node 110 (e.g., node_A), node-local-unscheduler 190 obtains a notification of container 170 being scheduled to node_A (block 312). For example, the NLU 190 may poll nodes 110, such as node_A, to obtain information related to containers 170 scheduled on each node. In an example, the NLU 190 may continuously poll nodes 110. Additionally, the NLU 190 may have access to memory that includes a log of container transactions that indicate when a container 170 was scheduled to a node 110 and what node 110 the container 170 was scheduled to.

Node_A has resources, such as 350 m CPU and 1.5 GB of memory available (block 314). For example, node_A may have 350 m CPU and 1.5 GB of memory available for additional containers 170 after taking into account the current resource consumption of node_A (e.g., from other containers 170, pods 160, and/or processes). Additionally, container 170 requires 200 m CPU and 2 GB of memory (block 316). For example, container 170 may have specific resource requirements, such as 200 m CPU and 2 GB of memory, to perform tasks and execute applications. Then, the NLU 190 compares available resources on node_A to the resource requirements of container 170 (block 318). For example, the NLU 190 compares the available resources on nodes 110, such as node_A (e.g., 350 m CPU and 1.5 GB of memory), to the resource requirements of container 170 (e.g., 200 m CPU and 2 GB).

Containers 170, pods 160, and/or nodes 110 may include various scheduling polices. In the illustrated example, container 170 has an anti-affinity scheduling policy (block 320). For example, along with having set resource requirements, container 170 may have an anti-affinity scheduling policy, such that container 170 should not be scheduled on a node 110 with other containers 170. As discussed above, nodes 110 may also have scheduling policies, such as affinity scheduling or anti-affinity scheduling. Additionally, node_A is currently running other containers (block 322). For example, several other containers 170 may be running on node_A due to resource requirements, for example, the other containers running on node_A may require resources specific to node_A. Then, the NLU 190 reviews the operation environment of node_A and the scheduling policies of container 170 (block 324). In an example, the NLU 190 may review the operation environment, such as available resources, information of other containers 170 running on node_A, and the scheduling policies of container 170. For example, due to other containers 170 running on node_A, NLU 190 may determine that node_A is in violation of the anti-affinity policy of container 170. Due to the operation environment and scheduling policies, NLU 190 determines that container 170 fails validation (block 326). For example, NLU 190 may determine that container 170 fails validation because node_A has insufficient available resources and/or because node_A violates the anti-affinity scheduling policy of container 170.

Then, the NLU 190 annotates the container 170 (blocks 328 and 330). For example, the NLU 190 may annotate container 170 by updating metadata of the container 170. For example, a condition may be added to a "container_conditions" field in the metadata. For example, writing a new condition for the container 170 may include a timestamp and may be immutable. In another example, a value may be deleted from the container metadata. The container 170 is annotated to indicate that the container 170 failed validation on node_A (block 332). For example, the container 170 may have a "failed validation" annotation in the container metadata with a node identifier for node_A. Then, the NLU 190 stops execution of container 170 (block 334). For example, after annotating the container 170, the NLU 190 may stop execution of the container 170 to prevent further execution on an unsatisfactory node, such as node_A, which advantageously prevents or limits the risk of a container crash or other problems affecting processes running on node_A due to a scheduling violation (e.g., lack of node resources). Then, node_A receives a stop execution message for container 170 (block 336). For example, NLU 190 may direct node_A to stop execution of the container 170. Next, container 170 is killed (block 338). For example, node_A may kill or terminate container 170 responsive to receiving the stop execution message from the NLU 190. Additionally, the NLU 190 may kill container 170.

At various times, scheduler 180 polls containers 170 (block 340). Due to the polling, scheduler 180 detects the annotation on container 170 (block 342). For example, the NLU 190 may continuously poll containers 170 to detect annotations denoting containers failing validation, and upon recognizing container 170 failed validation, the NLU 190 may reschedule container 170. Then, the scheduler 180 reschedules container 170 to node_B (blocks 344, 346, and 348). For example, container 170 may be scheduled to node_B after the scheduler 180 does a preliminary review of the container 170 and available nodes 110. Container 170 is then scheduled to node_B (blocks 350 and 352). In an example, node_B may be deemed to be a suitable destination for container 170 based on a preliminary review of the available resources of node_B.

Then, node_B executes container 170 (block 354). For example, after the container is scheduled to node_B, container 170 is executed by node_B. Additionally, node_B may be in the same node cluster as node_A, which may correspond to the same NLU 190. For example, NLU 190 may already be running in the background on the node cluster that includes node_B. After node_B executes the rescheduled container 170, the container 170 is running on node_B (block 356). For example, container 170 may be started on node_B immediately after rescheduling, without hesitation.

After the container is rescheduled to a node (e.g., node_B), node-local-unscheduler 190 obtains a notification of container 170 being scheduled to node_B (block 358). For example, the NLU 190 may have a watch on all nodes 110, such that the NLU 190 is notified once container 170 is scheduled to node_B. Node_B has available resources, such as 250 m CPU and 3 GB of memory (block 360). For example, node_B may have 250 m CPU and 3 GB of memory available for additional containers, such as container 170, after taking into account the current resource consumption of node_B (e.g., from other containers or processes). After the NLU 190 is notified that container 170 is scheduled to node_B, the NLU 190 compares available resources on node_B to the resource requirements of the container 170 (block 362). For example, the NLU 190 compares the available resources on nodes 110, such as node_B (e.g., 250 m CPU and 3 GB of memory), to the resource requirements of container 170 (e.g., 200 m CPU and 2 GB). In its current operation state, node_B is not running other containers (block 364).

Then, NLU 190 reviews the operation environment of node_B with the scheduling policies of container 170 (block 366). In an example, the NLU 190 may review the operation environment, such as available resources, information of other containers 170 running on node_B, and the scheduling policies of container 170. For example, due to sufficient resources on node_B and no scheduling violations associated with node_B, NLU 190 may determine that node_A is an appropriate destination for container 179. Next, NLU 190 determines that container 170 passes validation (block 368). In an example, the NLU 190 may annotate container 170 to indicate that it passed validation and the container 170 can start on node_B or continue running on node_B. As described above, the NLU 190 and watch module 182 advantageously enable containers 170 to be rescheduled by using a lightweight node-local-unscheduler 190 to annotate and stop problematic containers 170.

Figure 4:
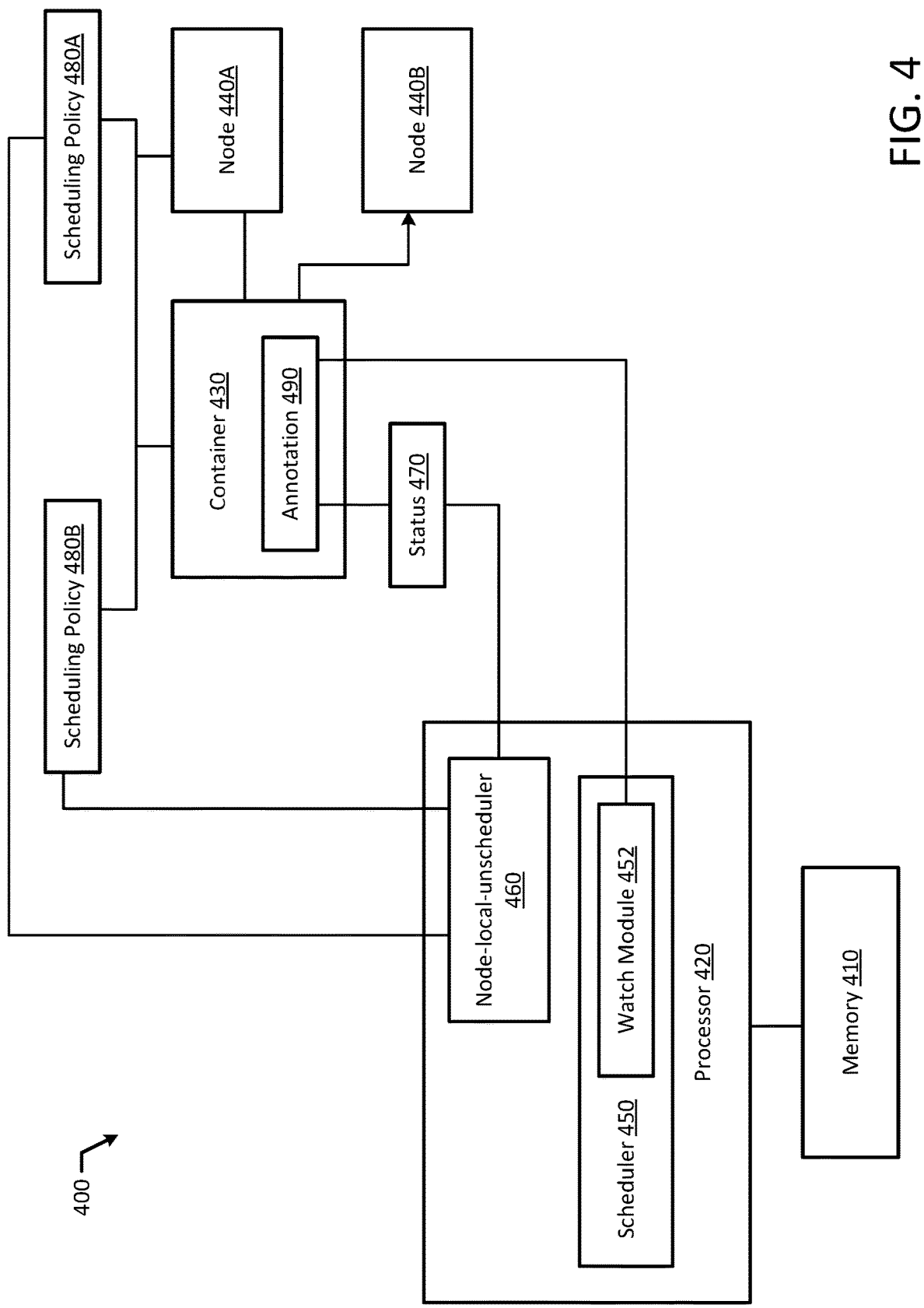
FIG. 4 illustrates a block diagram of an example container system for scheduling remediation according to an example embodiment of the present disclosure.

FIG. 4 is a block diagram of an example system 400 for container scheduling remediation according to an example embodiment of the present disclosure. The system 400 for container scheduling remediation may include a memory 410, a processor 420 in communication with the memory 410, a container 430 scheduled on a first node 440A, a scheduler 450 executing on the processor 420, and a node-local-unscheduler 460. The scheduler 250 may include a watch module 452. The NLU 460 executes on the processor 420 to determine a status 470 of the container 430 as failing validation. The NLU 460 may have access to scheduling policies 480A-B corresponding to the container 430 and the first node 440A. Responsive to determining the status 470 of the container 430 as failing validation, the NLU 460 may annotate the container 430 with an annotation 490 and may stop execution of the container 430. The watch module 452 executes on the processor 420 to detect the annotation 490 associated with the container 430. Responsive to detecting the annotation 490, the container 430 is rescheduled to a second node 440B.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:

a memory;

at least one processor in communication with the memory;

a container scheduled on a first node;

a scheduler executing on the at least one processor, the scheduler having a watch module;

wherein the scheduler is configured to implement scheduling on one or more containers prior to validation when the one or more containers are in a pending state; and a node-local-unscheduler (NLU) executing on the at least one processor, wherein the NLU executes on the at least one processor to:

determine a status of the container as failing validation because the container and the first node have conflicting scheduling policies, wherein the NLU has access to the scheduling policies corresponding to the container and the first node, and the scheduling policies are one of affinity scheduling and anti-affinity scheduling, responsive to determining the status of the container as failing validation, annotate the container, and stop execution of the container, and wherein the watch module executes on the at least one processor to:
- detect an annotation associated with the containe;
- responsive to detecting the annotation, reschedule the container to a second node, wherein the watch module reschedules annotated containers in a higher priority queue; and
- responsive to rescheduling the container, remove the annotation associated with the container.

2. The system of claim 1, wherein the first node and the second node are in different node clusters.

3. The system of claim 1, wherein determining the status of the container includes comparing resource requirement metrics of the container with resource availability metrics of the first node, and wherein the container fails validation because the first node has insufficient resources for the container.

4. The system of claim 1, wherein determining the status of the container includes checking the scheduling policies of the container and operation environment conditions of the container.

5. The system of claim 4, wherein the operation environment conditions include information about other containers scheduled to the first node.

6. The system of claim 1, wherein the container is annotated with a flag.

7. The system of claim 1, wherein the container is in a pod, which is rescheduled to the second node upon failing validation.

8. A method comprising:
- scheduling, by a scheduler, a container of one or more containers, wherein the scheduler is configured to implement scheduling of the one or more containers prior to validation when the one or more containers are in a pending state;
- determining, by a node-local-unscheduler (NLU), a status of the container scheduled on a first node as failing validation because the container and the first node have conflicting scheduling policies, wherein the NLU has access to the scheduling policies corresponding to the container and the first node, and the scheduling policies are one of affinity scheduling and anti-affinity scheduling;
- responsive to determining the status of the container as failing validation, annotating, by the NLU, the container;
- stopping, by the NLU, execution of the container;
- detecting, by a watch module, an annotation associated with the container;
- responsive to detecting the annotation, rescheduling the container to a second node, wherein the watch module reschedules annotated containers in a higher priority queue; and
- responsive to rescheduling the container, removing, by the watch module, the annotation associated with the container.

9. The method of claim 8, wherein the first node and second node are in different node clusters.

10. The method of claim 8, wherein determining the status of the container includes comparing resource requirement metrics of the container with resource availability metrics of the first node, and wherein the container fails validation because the first node has insufficient resources for the container.

11. The method of claim 8, wherein determining the status of the container includes checking the scheduling policies of the container and operation environment conditions of the container.

12. The method of claim 11, wherein the operation environment conditions include information about other containers scheduled to the first node.

13. The method of claim 8, wherein the container is annotated with a flag.

14. The method of claim 8, wherein the container is in a pod, which is rescheduled, by the watch module, to a second node upon failing validation.

15. A non-transitory machine readable medium storing code, which when executed by one or more processors, causes a node-local-unscheduler (NLU) to:
- determine a status of a container scheduled on a first node as failing validation because the container and the first node have conflicting scheduling policies, wherein the NLU has access to the scheduling policies corresponding to the container and the first node, and the scheduling policies are one of affinity scheduling and anti-affinity scheduling;
- responsive to determining the status of the container as failing validation, annotate the container;
- stop execution of the container, wherein the annotated container is detected by a watch module, responsive to detecting an annotation, the container is rescheduled to a second node, wherein the watch module reschedules annotated containers in a higher priority queue, and responsive to rescheduling the container, the watch module removes the annotation which is associated with the container; and
- wherein responsive to one or more containers being in a pending state, the code, when executed by the one or more processors, causes a scheduler to implement scheduling of the one or more containers prior to validation.

16. The non-transitory machine readable medium of claim 15, wherein determining the status of the container includes comparing resource requirement metrics of the container with resource availability metrics of the first node, and wherein the container fails validation because the first node has insufficient resources for the container.

17. The non-transitory machine readable medium of claim 15, wherein determining the status of the container includes checking the scheduling policies of the container and operation environment conditions of the container.

18. The non-transitory machine readable medium of claim 17, wherein the operation environment conditions include information about other containers scheduled to the first node.

* * * * *

UNITED STATES PATENT AND TRADEMARK OFFICE
CERTIFICATE OF CORRECTION

PATENT NO. : 11,055,133 B2
APPLICATION NO. : 15/606697
DATED : July 6, 2021
INVENTOR(S) : Vyas et al.

Page 1 of 1

It is certified that error appears in the above-identified patent and that said Letters Patent is hereby corrected as shown below:

In the Claims

In Column 11, Line 3 (Claim 1), replace "containe;" with -- container; --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*